Dec. 25, 1951
P. A. TOLLE
2,579,713
FLOAT
Filed March 27, 1950
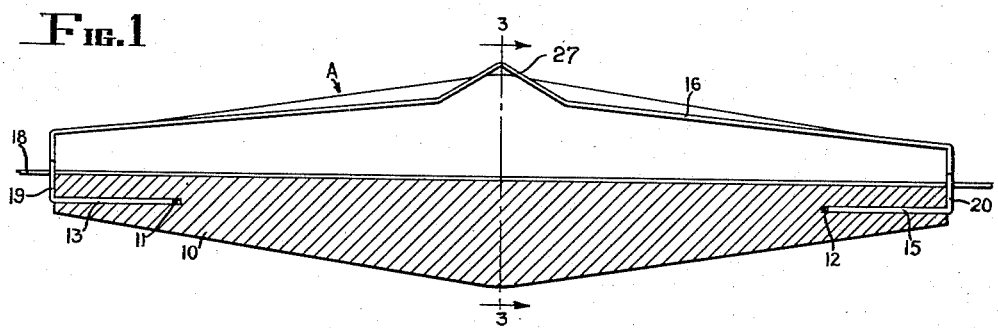
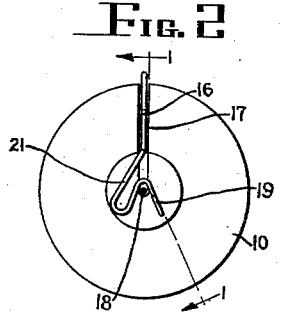
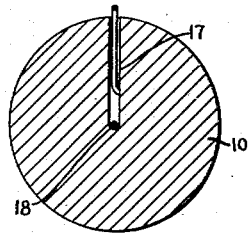
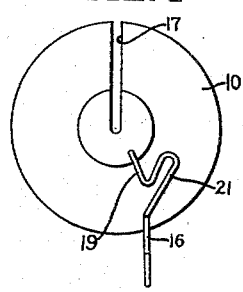
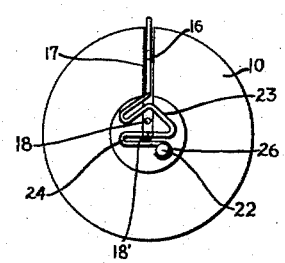
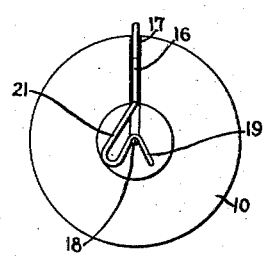
INVENTOR
PAUL A. TOLLE
BY *Irwin V. Glenn*
ATTORNEY Patented Dec. 25, 1951

2,579,713

UNITED STATES PATENT OFFICE 2,579,713

FLOAT

Paul A. Tolle, Dayton, Ohio

Application March 27, 1950, Serial No. 152,074

10 Claims. (Cl. 43—44.91)

This invention relates to floats formed of wood, cork or plastic material, and is concerned particularly with floats such as are used for fishing lines, wires, fishing nets, surf lines and the like.

It is the principal object of this invention to provide a simple, inexpensive, serviceable and quickly changeable float for fishing lines, or wires used in casting or in still fishing, and fishing nets and surf lines.

Another object of the invention is to provide such a float which may be of any desired size and configuration within the limits of the particular length and diameter of the line or net so that such float may meet the particular line or net requirements.

It is also an object of this invention to provide a float which is adapted to be locked on a line or cord in such a manner that the float may freely slide along the line or cord.

It is a further object of the present invention to provide a unitary construction of float which will afford an accurately positioned fishing line or net float without the necessity of knotting the line or net or tying the line to the float.

A still further object of the invention is to provide such a float provided with a coating of phosphorescent material of contrasting colors rendering the float luminous and readily visible during varying conditions of poor illumination or in the dark.

Still another object of the invention is to provide such a float having a releasable locking means adapted to lockingly engage the float with a fishing line, wire or net which prevents the line, wire or net from whipping out of engagement with the float.

The manner in which these and other objects of the invention are attained will be evident from the following description taken in conjunction with the accompanying drawings and the appended claims.

In accordance with this invention provision is made for an improved float constructed to be used with lines, wires, cords, fishing nets or surf lines. Preferably this float is made of an elongated body member that is provided with a longitudinal groove extending throughout the length thereof for the purpose of receiving a line or supporting cord, as for example, a fishing line, cord, net or surf line. This groove is made of sufficient depth and width so that the line or cord may be well lodged therein. A locking device for holding or clamping the line or cord in said groove is pivoted at both ends of the float body member and is preferably shaped so that it rests in the aforesaid groove. The central part of the locking device is provided with a thumbnail grip so that this device may be pulled out of the groove to swing on its pivots and permit the line or cord to move axially in the groove or to be lifted out of the groove.

Reference is made to the drawings which illustrate preferred embodiments of the invention, and in which like parts are designated by the same numerals.

Fig. 1 is a longitudinal sectional view showing one form of float and constructed in accordance with the present invention;

Fig. 2 is an end view of the float shown in Fig. 1;

Fig. 3 is a sectional view taken along the line 3—3 of Fig. 1;

Fig. 4 is an end view showing a suitable float clamp or lock in open position which permits ready insertion of a fishing line, wire or cord into the float groove and removal therefrom when desired without difficulty;

Fig. 5 is an end view showing a modified form of a float clamp and pivot constructed in accordance with the invention and having two line engaging members, one such member being in position to securely clamp a line, wire or cord and the other member being in position to clamp the line, wire or cord so that the float may freely move thereon; and Fig. 6 is an end view showing a modified form of float constructed in accordance with this invention with a line or cord engaging member in a position to prevent the float from sliding along the line or cord.

Referring in detail to the drawings, with particular reference to Fig. 1, an embodiment of the present invention illustratively shown and designated by the reference character A, includes a body member 10 which is preferably made of a light-weight water floatable material such as wood, cork or a homogeneous plastic material. In this specific embodiment, the body member 10 is constructed of wood, preferably made to taper from the thick central portion thereof towards each end thereof, and may be provided with a suitable water impervious coating, such as varnish or shellac to preserve its buoyancy and to prevent water from penetrating and deteriorating the member. Holes 11 and 12 are drilled into the ends of the body member 10 to receive the end portions 13 and 15 of the clamping member 16 and these holes are slightly displaced from the center of the body member. The clamping member 16 is preferably made of a suitable resilient and rustless allow which may be expanded if desired, to any predetermined size within the limits of the particular size of float of the present invention. In the specific embodiment described above, the clamping member is conveniently formed of hard spring brass or stainless steel wire.

As illustrated in Fig. 3, a groove 17 is cut or formed into the body member 10 from one end thereof to the other and this groove extends substantially to the axis of the body member for the purpose of receiving the fishing wire, line or cord 18. Groove 17 is also adapted to receive the clamping member 16 as shown in Figs. 1 and 2 for the purpose of locking the fishing wire, line or cord 18 in the groove. The clamping member 16 is provided with bent portions 19 and 20 at each end thereof, each of these bent portions being in the shape of an inverted V as shown in Fig. 2. These inverted V shaped bent portions 19 and 20 are positioned adjacent to end portions 13 and 15 of the clamping member 16 and they are arranged or disposed so that the wire, cord or line 18 when positioned in the groove 17 passes through these V shaped portions to be held thereby at the ends of the groove 17 in such a manner that the wire or line 18 becomes lockingly engaged with the float A while at the same time permitting the float A to readily slide along the wire, line or cord 18.

The clamping member 16 is bent back upon itself adjacent to one side of the inverted V shaped portion to form side portions 21 substantially parallel to one side of the inverted V shaped portions 19 and 20. This construction increases the springiness of the clamping member 16 so that portions of this member will spring or jump into the groove 17 to be lodged therein during the aforementioned float-line locking operation. For this purpose, the clamping member 16 is shaped to extend well into the groove 17 on each side of the finger grip portion 27 so as to serve as a lock and securely hold the inverted V shaped portions 19 and 20 in position.

In order to release the fishing wire or line 18, the clamping member 16 is lifted out of the groove 17 by lifting the finger grip portion 27 and the clamping member 16 is then rotated about half way around the outside of the body member 10 on its pivots formed by the end portions 13 and 15 that are lodged in the holes 11 and 12 respectively. The inverted V shaped members 19 and 20 are thus swung away from the ends of the groove 17 as shown in Fig. 4, thus permitting the wire or line 18 to be taken out of the groove 17 or positioned therein without obstruction.

In Fig. 5 there is shown a modified form of clamping member 16 and pivot fastening means, as for example, a headed pin or screw 22, the clamping member in this modification having bent portions 23 and 24 at each end thereof adapted to engage the line or cord 18, bent portions 23 and 24 terminating as a bend or loop 26 adapted to securely engage the fastening means 22. Bent portions 23 and 24 are positioned adjacent the end portions of the body member 10, these portions 23 being arranged to engage the line or cord 18 in such a manner as to permit the float A when in use, to readily slide along the line. As shown, bent portions 24 are arranged so that the line or cord when in the position indicated by 18' passes through these portions to be clamped thereby against the ends of the groove 17 so that the cord or line is tightly gripped by this clamping action and is held against slipping in the groove. By this modification of the invention, a line engaging means is provided which may either clamp the line 18 against slippage, or may engage the line so that the float A may readily slide along the line. Moreover, if desired, the pivot fastening means 22 of this modification may be provided at each end of the body member 10 in place of the end portions 13 and 15 shown in Fig. 1.

Referring to Fig. 6, a modification is shown in which the line or cord 18 is clamped against the ends of the groove 17 whereby the line or cord passes through inverted V shaped portions 19 and 20 to be clamped thereby against the ends of the groove 17 so that the line or cord is tightly gripped by this clamping action and is held against slippage in the groove instead of being loosely engaged as shown in Figs. 2 and 3.

Over the facing of the float A may be applied an ordinary enamel or resin emulsion type paint coating of contrasting colors, as for example, white and red, which further enhances the buoyancy and perceptibility of the float. Moreover, if desired, the float may be provided with a suitable coating of phosphorescent paint material of contrasting colors which provides a luminous and readily visible surface during varying conditions of poor illumination or in the dark.

There has thus been provided simpel and efficient devices of the kind described and for the purposes specified.

While the articles herein described constitute preferred embodiments of the invention, it is to be understood that the invention is not limited to these precise articles, and that changes may be made therein without departing from the scope of the invention which is defined in the appended claims.

What is claimed is:

1. An elongated float comprising a body member having a groove cut therein throughout the length thereof, said groove being adapted to receive a cord, a resilient member pivoted at each end of said body member, said resilient member extending longitudinally across said body member and substantially into said groove for locking engagement therewith, said resilient member having means for securing said cord against the ends of said groove, and said resilient member having a grip portion projecting forwardly from said groove so that said resilient member may be gripped thereby and released from said groove to release said cord.

2. A float comprising a body member having a groove cut therein, said groove being adapted to receive a cord, a resilient member pivoted at each end of said body member, said resilient member having means for engaging said cord at the ends of said groove whereby said float is slidably attached to said cord, said resilient member extending across said body member and substantially into said groove for locking engagement therewith, said resilient member having a grip portion projecting upwardly from said groove so that said resilient member may be gripped thereby and released from said groove to release said cord.

3. An elongated float comprising a body member having a groove cut therein throughout the length thereof, said groove being adapted to receive a cord, a resilient member pivoted at each end of said body member, said resilient member extending longitudinally across said body member and substantially into said groove for locking engagement therewith, said resilient member having bent portions for securing said cord against the ends of said groove, and said resilient member having a grip portion projecting forwardly from said groove so that said resilient member may be gripped thereby and released from said groove to release said cord.

4. An elongated float comprising a body member having a groove cut therein through the length thereof, said groove being adapted to receive a cord, a resilient member pivoted at each end of said body member, said resilient member having bent portions disposed for clamping said cord at the ends of said groove whereby said float is securely attached to said cord, said resilient member extending across said body member and substantially into said groove for locking engagement therewith, said resilient member having a grip portion projecting upwardly from said groove so that said resilient member may be gripped thereby and released from said groove to release said cord.

5. A float comprising an elongated body member having a groove cut therein throughout the length thereof, said groove extending substantially to the center of said body member and being adapted to receive a cord, a resilient wire member pivoted at each end of said body member for engaging said cord at the ends of said groove whereby said float is slidably attached to said cord, said resilient wire member extending longitudinally across said body member and substantially into said groove for locking engagement therewith, said resilient wire member having a grip portion projecting upwardly from said groove so that said resilient wire member may be gripped thereby and released from said groove to release said cord.

6. A float comprising an elongated body member having a groove cut therein throughout the length thereof, said groove extending substantially to the center of said body member and being adapted to receive a cord, a resilient wire member, said body member having fastening means in the ends thereof to receive the ends of said wire member, said wire member having bent portions for engaging said cord against the ends of said groove whereby said float is slidably attached to said cord, said resilient wire member extending longitudinally across said body member and substantially into said groove for locking engagement therewith, said resilient wire member having a grip portion projecting upwardly from said groove so that said resilient wire member may be gripped thereby and released from said groove to release said cord.

7. A float comprising an elongated body member having a groove cut therein throughout the length thereof, said groove extending substantially to the center of said body member and being adapted to receive a cord, a resilient wire member pivoted at each end of said body member and having V-shaped bent portions disposed for lockingly securing said cord at the ends of said groove, said resilient wire member extending longitudinally across said body member and substantially into said groove for locking engagement therewith, said resilient wire member having a grip portion projecting upwardly from said groove so that said resilient wire member may be gripped thereby and released from said groove to release said cord.

8. A float comprising an elongated body member having a groove cut therein throughout the length thereof, said groove extending substantially to the center of said body member and being adapted to receive a cord, a resilient wire member, said body member having holes formed in the ends thereof to receive the ends of said wire member and form pivots for said wire member, said wire member having bent portions disposed for locking said cord against the ends of said groove, said resilient wire member extending longitudinally across said body member and substantially into said groove for locking engagement therewith, said resilient wire member having a grip portion projecting upwardly from said groove so that said resilient wire member may be gripped thereby and released from said groove to release said cord.

9. An elongated float comprising a body member provided with a coating of phosphorescent material, said body member having a groove cut therein throughout the length thereof, said groove being adapted to receive a cord, a resilient member secured at each end of said body member, said resilient member extending longitudinally across said body member and having releasable locking means adapted to lockingly engage said cord with said body member, said resilient member having a grip portion projecting upwardly from said groove so that said resilient member may be gripped thereby and released from said groove, said body member being adapted to produce light from invisible light rays rendering the float luminous during varying conditions of poor illumination.

10. A float comprising a body member of plastic material, said body member having a groove formed therein, said groove being adapted to receive a cord, a resilient member pivoted at each end of said body member, said resilient member extending longitudinally across said body member and being adapted to lock itself in said groove, said resilient member having bent portions disposed for lockingly securing said cord against the ends of said groove, and said resilient member having a grip portion projecting upwardly from said groove so that said resilient member may be gripped thereby and released from said groove to release said cord.

PAUL A. TOLLE.

REFERENCES CITED

The following references are of record in the file of this patent:

UNITED STATES PATENTS

| Number | Name | Date |
|---|---|---|
| 1,371,188 | Wells | Mar. 8, 1921 |
| 1,950,933 | Snell | Mar. 13, 1934 |